Aug. 10, 1937.  W. W. CRILEY  2,089,733
CLUTCH AND BRAKE
Filed Nov. 30, 1934  2 Sheets-Sheet 1
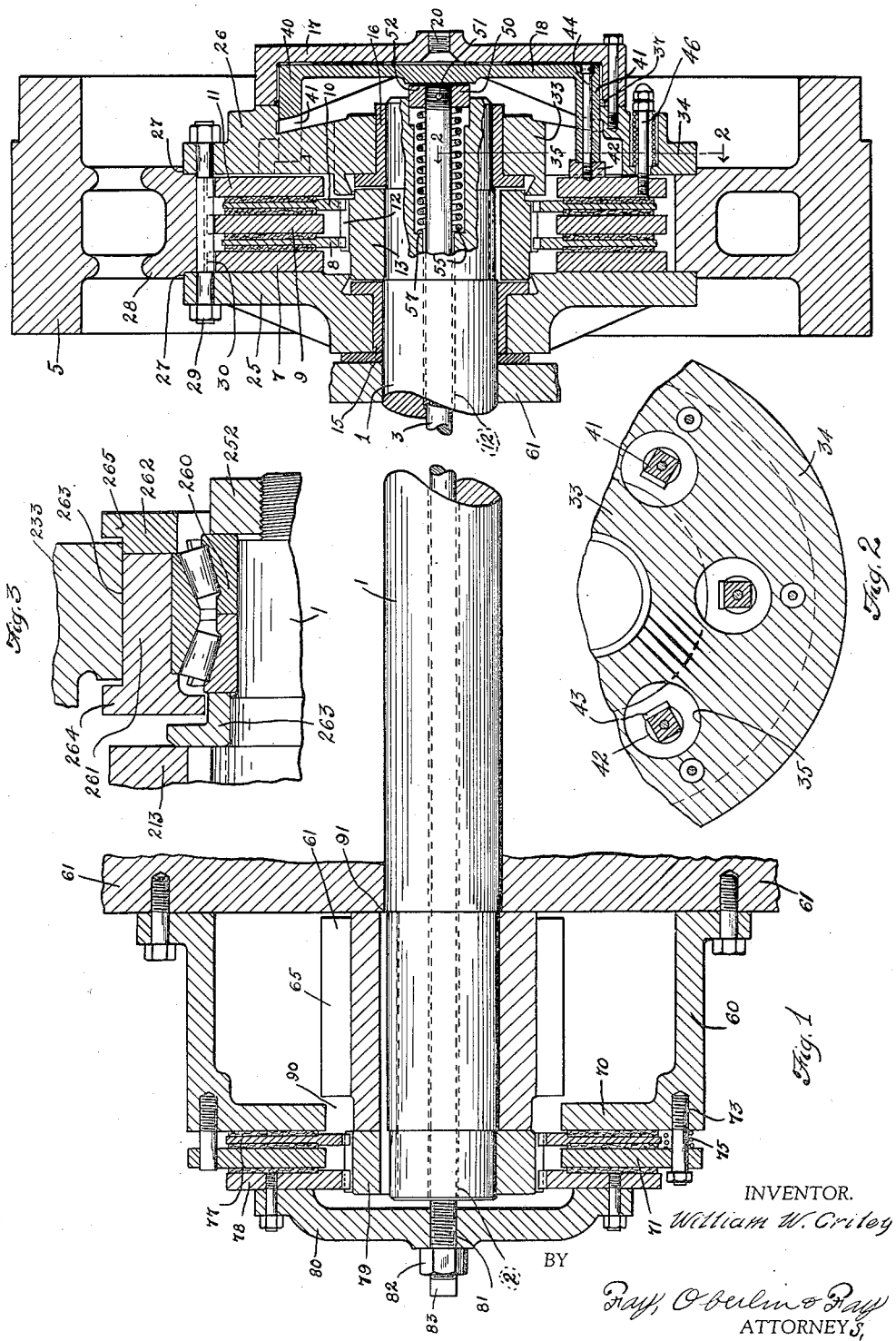
INVENTOR.
William W. Criley
BY
Ray, Oberlin & Ray
ATTORNEYS.

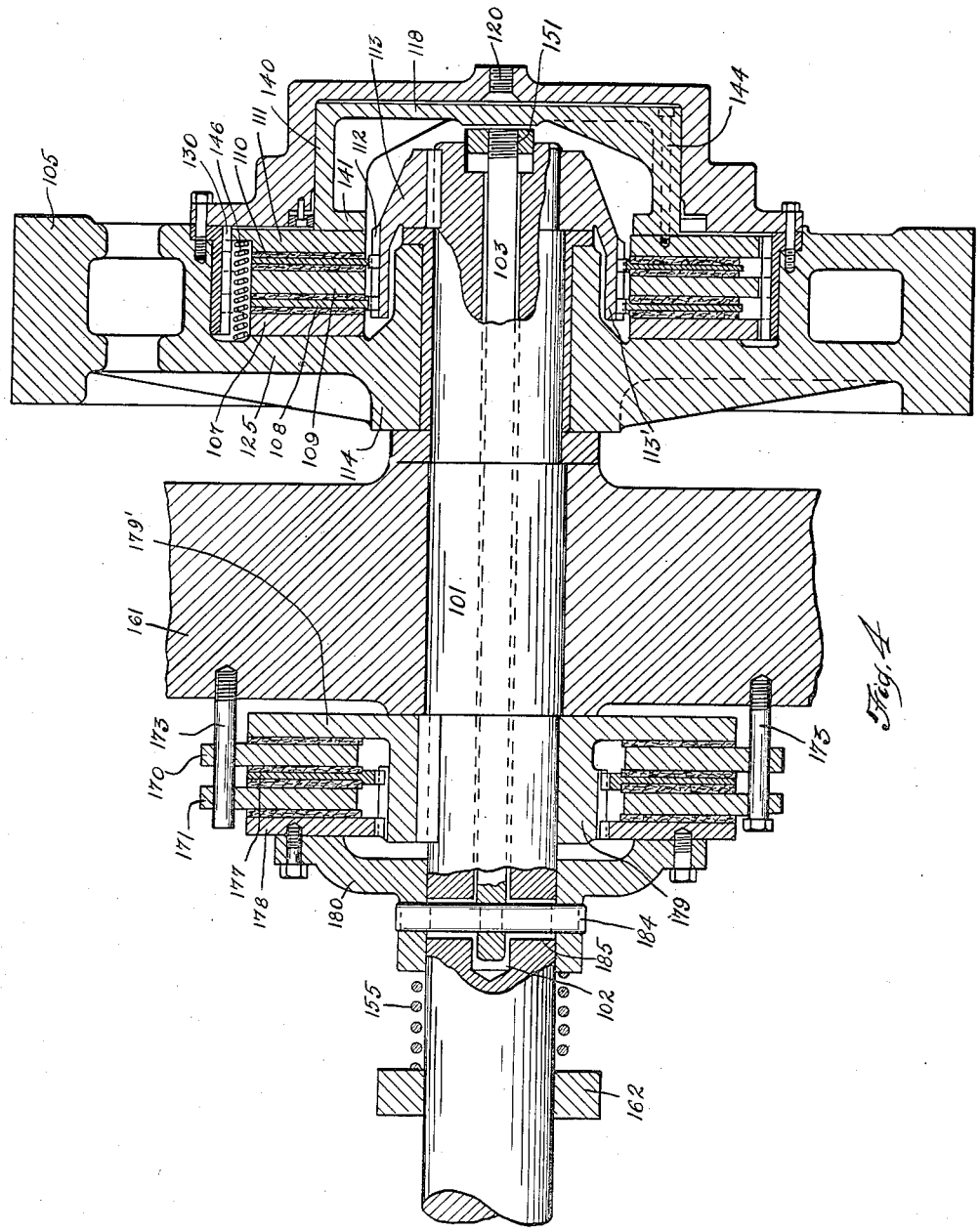

Patented Aug. 10, 1937

2,089,733

UNITED STATES PATENT OFFICE 2,089,733

CLUTCH AND BRAKE

William W. Criley, Cleveland, Ohio

Application November 30, 1934, Serial No. 755,280

4 Claims. (Cl. 192—18)

This invention relates to a combination clutch and brake assembly wherein both the clutch element and the brake element have certain inventive features each affecting the operation of the other, as well as inventive features in themselves, and wherein the combination results in reduction and advantageous distribution of operating strains, certainty of action, compactness, strength, facility for servicing and adjustment, convenience of manufacture and assembly, and other advantages. Further aims of this invention are to attain perfect coordination of clutch and brake, and, where compressed air is the actuating medium, to reduce the quantity of air used. Another advantage secured by the invention is quick action of both brake and clutch elements.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 1 is a central axial section through the clutch and brake assembly, certain parts being shown in elevation;

Fig. 2 is a partial transverse vertical section on the line 2—2 of Fig. 1 in the direction of the arrows;

Fig. 3 is a fragmentary central axial section through the clutch portion of the assembly illustrating a bearing detail in connection with a roller bearing;

Fig. 4 is a central axial section through a modified form and arrangement of the assembly, with certain parts in elevation.

In the preferred form illustrated in Fig. 1 the assembly comprises a clutch on one end and a brake on the other end of a shaft 1, which it is preferred shall be the driven shaft. This shaft is centrally hollowed throughout its length as indicated at 2 (or through only a part of its length as at 102, Fig. 4) and a push rod 3 is freely movable through the bore 2 in a manner hereinafter described in detail.

The clutch element, which is shown at the right end of Fig. 1 is, in this preferred illustrative embodiment, of the type housed entirely within a flywheel 5 which will be described as the driving member. Movable ring-shaped plates such as 7, 9 and 11 are keyed within the clutch for axial movement, for example on members 30, and are disposed alternately with other movable plates 8 and 10 keyed to the driven element as by splines 12. The usual friction facing is shown on the plates but not designated by a reference character. Although the splines might be formed directly upon the shaft 1, in the larger clutch sizes it is the more general and satisfactory practice to have a collar such as 13 fast upon the shaft 1 and to form the splines in the periphery of the collar.

The flywheel 5 straddles the driven plates, riding on the shaft 1 on bearings 15 and 16 at opposite ends of the collar 13. A fluid pressure cylinder 17 with a cylindrical piston 18 movable therein to force the plates into engagement, is secured in one end of the clutch, being supported by the flywheel casing. A centrally located fluid connection to the cylinder is indicated at 20.

In more detail, the flywheel shown as an example of my invention, and which is illustrative of a construction particularly adapted for a large installation to operate heavy machinery, is built up of a back plate 25 and a front plate 26 each rabbeted as at 27 to an inner flange 28 and cross connected by bolts 29. These bolts may be square in body cross section as indicated at 30, to act as teeth whereon the driving plates 7, 9 and 11 slide and by which they are keyed to rotate with the flywheel. Each of these front and back covers 25 and 26 has a central opening for the reception of the bearings 15 and 16 respectively. The front cover 26 comprises a central ring-shaped hub 33 and an outer ring 34, the two being separated by a series of openings 35, as best seen in Fig. 2. The face of the clutch is closed by the cylinder 17, which is made in the form of a cap and suitably bolted to the outer ring 34 of the front cover 26. Piston packing 37 is mounted at the joint between the cap and the front cover, or the packing may be carried by the piston.

The piston 18 is skirted as at 40, with fingers such as 41 in prolongation of the skirt passing through successive openings 35 to transmit the piston thrust to the ring 11. As a convenient means of connection, buttons 42, each having a positioning flange 43, are provided at intervals around the ring 11. Bolts 44 connect the head of the piston 18 with the buttons 42 and ring 11. The clutch plates are disengaged by a series of springs around bolts 46.

With the heavy piston stresses encountered in the operation of large clutches there is a tendency to spread the clutch walls and to some extent to thus misalign the bearings. The tendency is especially objectionable when tapered roller bearings, such as those shown in Fig. 3, or ball bearings, are used.

By applying the principle of allowing flywheel wall movement axially, the piston thrust is exerted entirely in forcing the clutch elements together and in the spreading of the flywheel faces, and is not carried through as added axial load upon the bearings. As a result perfect bearing alignment is maintained whether the clutch is engaged or free.

The application of this principle is shown in Fig. 3 as applied to a roller bearing. The bearing illustrated is of the double tapered self-aligning type and is the counterpart of the bearing 16 in Fig. 1. In the construction shown, which is only one of many which might be employed, a pair of taper roller bearings, generally indicated by the reference character 260, and inclined toward one another, are held on the shaft 1 by a collar 252. These bearings 260 carry the hub 233 of the outer flywheel wall upon a radially flanged ring here shown as composed of the two elements 261 and 262 fastened together by suitable means, not shown. A spacer 263 is used to hold the bearing clear of the collar 213, corresponding to the collar 13 of Fig. 1.

The ring elements 261 and 262 have an outer cylindrical surface common to both, this surface being designated by the reference character 263. The surface 263 is longer than the inner edge thickness of the hub 233 which bears thereon, the amount of clearance at each end being ordinarily on the order of $\frac{1}{16}$ to $\frac{1}{8}$ inch. The movement of the flywheel hub 233 on its cylindrical bearing 263 is limited by flanges 264 and 265 bounding the ends of the surface 263. By this or an equivalent arrangement on one or both bearings, the action and reaction of the piston thrust are entirely taken up in clutch plate movement and in a slight distortion of the flywheel structure, and are thus not transmitted to the shaft 1.

The rod 3 is headed at its end adjacent the face of the clutch by a collar or head 50 screwed onto the rod and pinned as at 51 against turning. This head serves the double purpose of a bearing to be engaged by a central pad 52 inside the piston face and as a shoulder to be engaged by one end of a coiled spring 55 which surrounds the rod 3 for a short distance in from this end. The passage 2 in the shaft 1 is suitably enlarged by successive steps to receive the spring 55 and to allow movement of the collar 50. The inner end of the spring 55 seats against a shoulder 57 at the inner end of the smaller recess.

The brake element, in the preferred embodiment, comprises a bracket 60 bolted or otherwise fixed to the machine frame 61 and carrying certain non-rotating friction elements interdisposed with rotating friction elements. In the assembly illustrated a drive pinion 65 is also secured to the shaft 1 for rotation therewith, to transmit power to further gearing, not shown. This pinion is so positioned with respect to the bracket 60 and the brake members carried by the bracket as to economize space in disposing the brake element with respect to the shaft and to the machine generally, as will appear hereafter.

The non-rotating elements of the brake comprise rings 70 and 71, the former preferably formed as a flange integral with the bracket 60, and the latter being ring-shaped plates similar to the clutch plates, secured to the bracket 60 by such suitable means as bolts 73 on which the rings 71 are spaced. Springs 75 surrounding the bolts 73 tend to separate the plates 70 and 71. The rotating plates, indicated by the reference characters 77 and 78, slide upon but rotate with a splined collar 79 which is fast upon the end of the shaft 2. The usual friction facing may be used on the various brake plates. The plate 78 is connected to the push rod 3 by a yoke 80 held on a threaded extension 81 of the rod 2 as by a nut 82. This extension 81 terminates as a squared end 83 useful when assembling the head 50 and yoke 70 on the rod and for subsequent adjustment for wear. The yoke 80 is bolted directly to the plate 78, with the result that movement of the rod 2 to the right by the action of the spring 55 upon release of air from the cylinder 17 brings the friction elements 70, 77, 71, 78 into braking contact.

The main drive pinion 65 is keyed to the shaft 1 immediately adjacent the collar 79, and is cut away as at 90 to clear the plate 70, thus giving the pinion a bearing on the shaft 1 slightly longer than the tooth length and at the same time not encroaching upon any space needed for the brake mechanism and its support. The inner end of the pinion 65 bears against a shoulder 91 on the shaft 1 and is thrust against the shoulder by the collar 79.

The operation, briefly outlined, is that admission of air at the connection 20 moves the piston 18 to the left, thus, through the fingers 41, moving the clutch plates into engagement. This same action pushes the rod 3 to the left, compressing the spring 55 and moving the yoke 80 and its attached plate 78 leftward, thus releasing the brake. Upon release of air from the cylinder 17 the spring 55 moves the piston back to the position shown and allows the clutch plates to spread assisted by the action of the springs and studs 46, the use of which is purely optional. This same movement, by the pull of the rod 3 upon the yoke 80, brings the brake plates into pressure contact, thus applying the brake.

Fig. 4 illustrates the preferred form of certain modifications of the clutch and brake assembly. The clutch element in this figure is of a different type from that in Fig. 1 and the brake element is also differently placed. So far as practical the reference characters of Fig. 4 correspond to those of Fig. 1; but are one hundred higher; thus the shaft 101 of Fig. 4 corresponds to the shaft 1 of Fig. 1, and so on.

The action of the clutch and brake is substantially the same as in the form shown in Fig. 1. The shaft 101 is axially bored as at 102 from the clutch end to a point beyond the brake. A rod 103 extends through this bore, this rod having an enlarged head 151 placed for engagement with the clutch piston 118. The brake element on the end of the shaft 101 remote from the clutch is supported by the machine frame 161. A spring 155 between an external axially movable yoke 180 of the brake element and an outer fixed bracket 162 applies the brake in the same manner as the spring 55 in Fig. 1.

Going back to the details of the clutch, the flywheel 105 is formed with a web 125 and hub 114. The hub, which is rotatable upon the shaft but fixed against axial movement, terminates short of the right end of the shaft. A collar 113 is keyed to the shaft end. This collar extends inwardly of the flywheel (leftward in the figure) in the form of a sleeve 113' overlying the right end of the hub 114, but radially spaced therefrom with clearance for rotation. The sleeve 113' is externally splined as at 112, to carry clutch plates 108 and 110 between clutch plates 107, 109 and 111 on splines 130 within the flywheel. The plates are friction faced as customary. The forward end of the skirted piston 118 is widened by an inward lip 141, and the plate 111 is bolted to the piston by a series of bolts 144. Admission of air through the inlet 120 forces the piston to the left and applies the clutch. Upon release of air pressure the thrust of the rod 103 against the inner surface of the piston 118, moving the piston to the right, allows the plates to separate. Springs 146 may be employed to assist this separation.

The rod 103 is, upon application of the clutch, pushed to the left, thus releasing the brake. The connection of this rod to the brake assembly is by a transverse pin 184 passing out through suitable slots 185 in the shaft 101 and into a yoke 180. The brake assembly is similar in general arrangement to that of Fig. 1. A splined collar 179 with a wide outward flange 179' to form one of the friction plate elements of the brake assembly, is keyed to the shaft 101. The collar splines also carry plates 177 and 178, rotatably fixed but axially movable. These plates are ring-shaped, the outer one, 178, being bolted to the yoke 180.

Suitable elements such as studs 173, which take into the machine frame 161, or a mechanical equivalent of these, hold other ring-shaped plates 170 and 171 against rotation, while permitting movement axially. The various brake plates are preferably friction faced.

The operation of this form of my improved clutch and brake is similar to that of the form illustrated in Fig. 1 and already described. It is to be noted that as a result of this invention, the amount of air consumed and the length of air lines necessary is much reduced as compared with the previous practice of having a brake pneumatically but not mechanically connected to the clutch. No air fittings or packings are necessary for the brake beyond those which are already required for the clutch; this for the reason that the clutch piston is the brake piston. Adjustments between clutch and brake are less frequently necessary, because by reason of the simultaneous action friction facings of suitably related size and character can be used on both, causing even wear on both, thus making possible a single or equal longitudinal take-up adjustment sufficient for the clutch element and for the brake element at the same time. Thus the engagement of the clutch with the release of the brake and vice versa can be perfectly coordinated. Very smooth machine action results from this even in the largest and heaviest mechanisms, such as forging machinery and the like.

Other modes of applying the principle of my invention may be employed instead of that explained, change being made as regards the mechanism herein disclosed, provided the means stated by any of the following claims or the equivalent of such stated means be employed.

I therefore particularly point out and distinctly claim as my invention:

1. In a combined clutch and brake, in combination, a rotatable shaft, a flywheel rotatable thereon, fixed support for said shaft, a clutch assembly between said flywheel and said shaft, and a brake assembly between said support and said shaft, mutually engageable plates in each assembly, certain of said plates in each assembly being fixed against rotation with respect to the shaft and the others being fixed against the rotation of said first-named plates, a fluid operable piston and cylinder in said flywheel and circumferentially movable only therewith, a connection from said piston to those plates which are fixed against rotation with respect to said shaft, and release mechanism operatively opposed to said piston.

2. In a combined clutch and brake, in combination, a rotatable shaft, a flywheel rotatable thereon, fixed support for said shaft, a clutch assembly between said flywheel and said shaft, and a brake assembly between said support and said shaft, mutually engageable plates in each assembly, certain of said plates in each assembly being fixed against rotation with respect to the shaft and the others being fixed against the rotation of said first-named plates, a piston and cylinder carried by said flywheel adjacent an end of said shaft, connections for actuating fluid to said cylinder, thrust-transmitting means between said piston and the plates of each assembly, and a spring engaged by said thrust-transmitting means and compressible by movement of the piston.

3. A clutch and brake assembly including in combination a shaft, a flywheel mounted adjacent one end of said shaft, fixed support for said shaft, mutually engageable clutch plates in said flywheel and on said shaft, a series of brake plates mounted alternately on said shaft and on said fixed support, all of said plates of both series being secured respectively against circumferential movement upon their respective mounting elements but axially movable thereon, a cylinder carried by said flywheel, a pressure fluid actuated piston axially movable in said cylinder, connections from said piston to both said series of plates, said connections including a rod extending centrally axially through said shaft and connecting said piston with said brake plates, and a spring engaging said rod adapted to move the rod contrary to the movement imparted by the piston.

4. A combined clutch and brake assembly comprising, in combination, a shaft, mounting means for said shaft, a flywheel rotatable selectively on or with said shaft, a multi-plate clutch carried by said flywheel and said shaft, a piston and cylinder for operating said clutch carried by said flywheel, a multi-plate brake on said mounting means and on said shaft axially spaced from said clutch, and means paraxial with said shaft connecting the shaft-carried plates of said brake with the flywheel-carried plates of said clutch for simultaneous longitudinal movement.

WILLIAM W. CRILEY.